March 9, 1926.   1,576,221
F. J. RIPPL
GLASS WORKING MACHINE
Filed Oct. 18, 1919   2 Sheets-Sheet 1

INVENTOR:
FRANCIS J. RIPPL,
BY
HIS ATTORNEY

March 9, 1926. 1,576,221
F. J. RIPPL
GLASS WORKING MACHINE
Filed Oct. 18, 1919 2 Sheets-Sheet 2
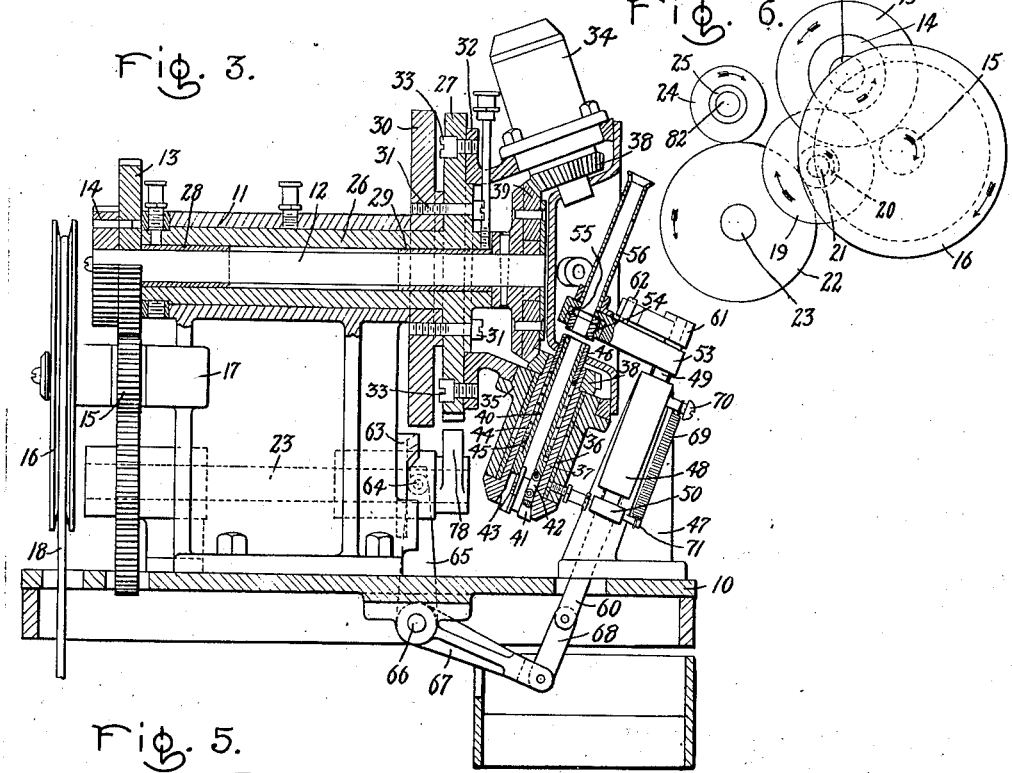
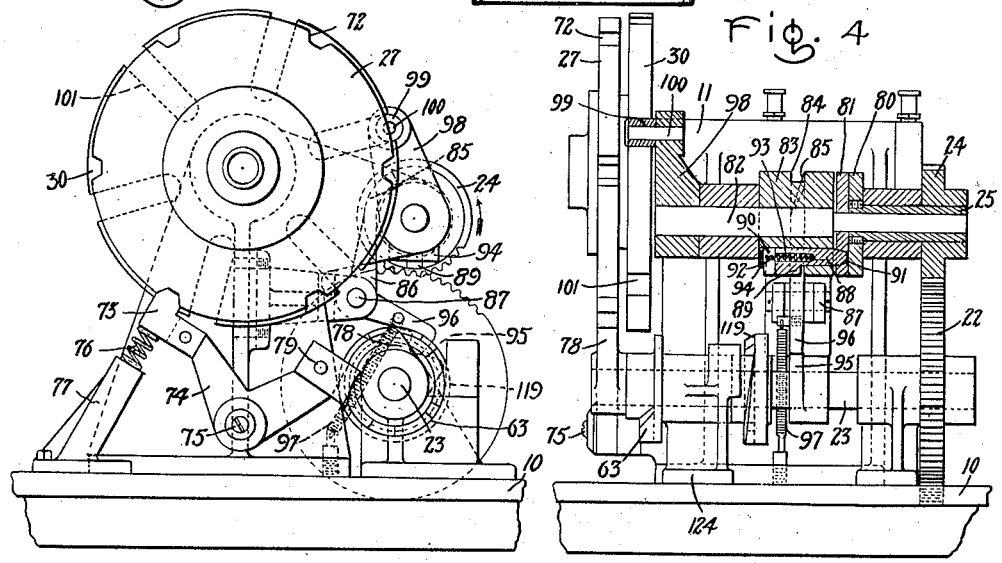
INVENTOR:
FRANCIS J. RIPPL,
BY
HIS ATTORNEY.

Patented Mar. 9, 1926.

1,576,221

UNITED STATES PATENT OFFICE.

FRANCIS J. RIPPL, OF CLEVELAND, OHIO, ASSIGNOR TO GENERAL ELECTRIC COMPANY, A CORPORATION OF NEW YORK.

GLASS-WORKING MACHINE.

Application filed October 18, 1919. Serial No. 331,660.

*To all whom it may concern:*

Be it known that I, FRANCIS J. RIPPL, a citizen of the United States, residing at Cleveland, in the county of Cuyahoga, State of Ohio, have invented certain new and useful Improvements in Glass-Working Machines, of which the following is a specification.

My invention relates to machines for shaping glass tubes and more particularly tubes of the character used in the manufacture of incandescent lamps.

My invention is particularly adapted to the production of the flared tubes used as stems in electric incandescent lamps. Such flared tubes have been made by machinery but my invention provides a more compact machine which, in its more specific form, is completely automatic and is capable of a much higher rate of output than prior machines. Greater uniformity and quality of the product is also a feature of the machine comprising my invention. Various other features and advantages will appear from the description which follows of a species thereof.

Figure 2:
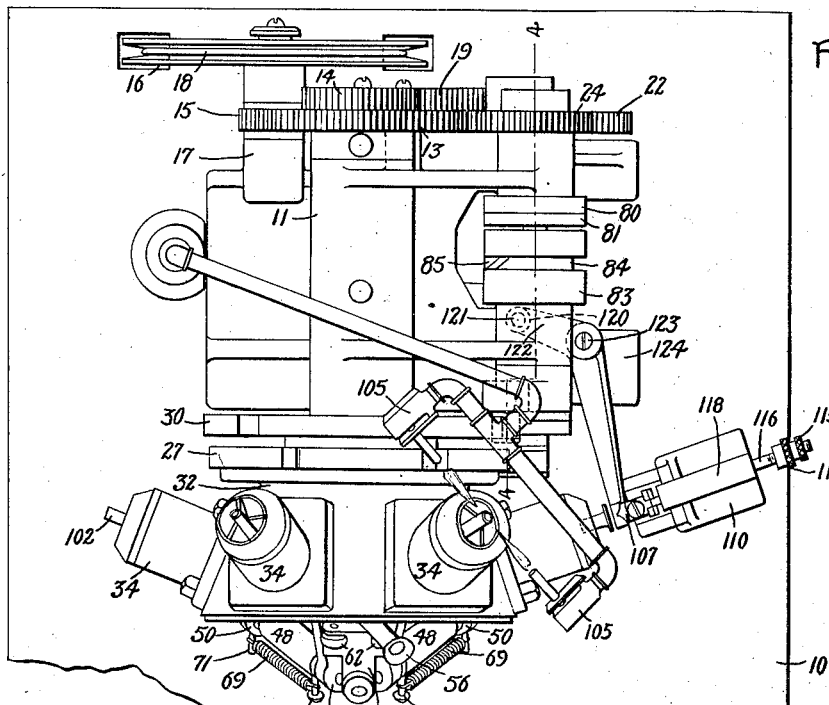
Figure 1:
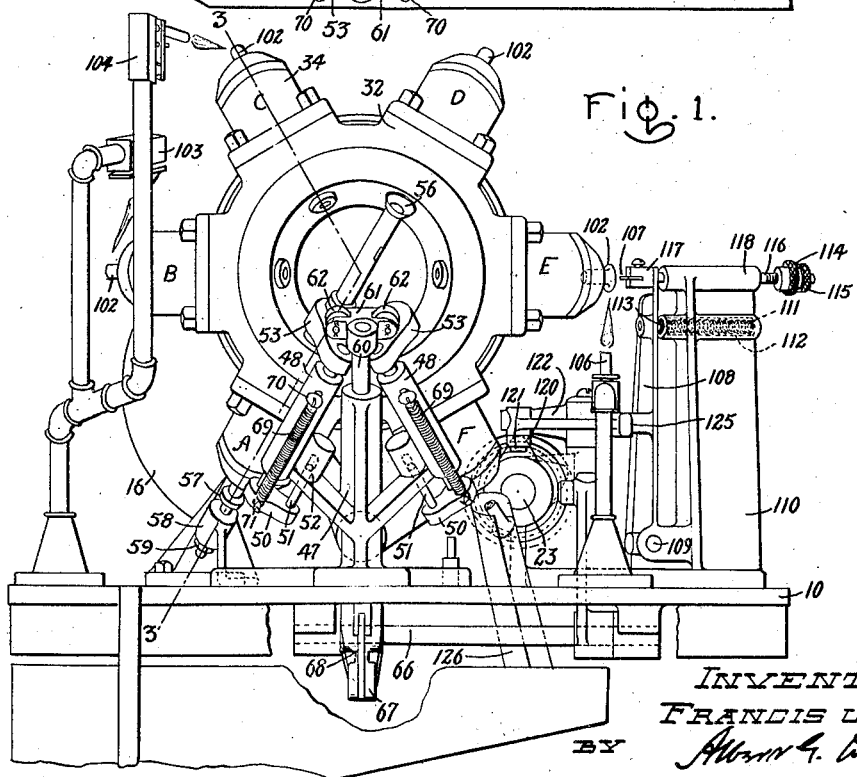

In the drawings, Fig. 1 is a front elevation of a machine comprised by my invention; Fig. 2 is a top plan view of the same; Fig. 3 is a side elevation of the same partially in section along the line 3—3 of Fig. 1; Fig. 4 is a side elevation of the indexing mechanism partially in section on the section line 4—4 of Fig. 2 for the sake of clearness; Fig. 5 is a front elevation of the same; and Fig. 6 is a diagram of the driving gears.

Referring to the drawings, the bed 10 carries a standard 11 which supports, as more fully described hereinafter, the main shaft 12 having attached at one end the two gears 13 and 14, the gear 13 being driven by the gear 15 fastened to the pulley 16 and supported on the stud 17 of the standard 11. The pulley 16 is driven by means of a belt 18 by a motor (not shown). Gear 14 meshes with the gear 19 integral with the gear 20 and rotating on the stud 21 (see Fig. 6). The gear 20 meshes with the gear 22 fastened to the shaft 23 (more fully described hereinafter) and the gear 22 meshes with the gear 24 on the tubular shaft 25 (more fully described hereinafter). Thus the rotation of the pulley 16 through the intermeshing gears just described causes the rotation of the shafts 12, 23 and 25.

The shaft 12 (Fig. 3) passes through the tubular shaft extension 26 of the face plate 27 and is separated therefrom by the bushings 28 and 29 so as to permit the free and independent rotation of either shaft. The shaft extension 26 has a bearing surface in the standard 11 and the face plate 27 has an indexing plate 30 fastened to its rear face by the machine screws 31. The conical support 32 is attached to the front of the face plate 27 by machine screws 33 and carries on its conical surface the tube holders 34 of which there are six in the present machine. The tube holders 34 are so mounted on the carrier or support 32 that glass tubes will feed through them by gravity. This construction permits a more compact machine than could otherwise be made.

Each holder 34 (Fig. 3) comprises a shell 35 having therein the two bushings 36 which furnish a bearing surface for the chuck cylinder 37 to which is fastened at the inner end a bevel gear 38 meshing with a bevel gear 39 attached to the inner end of the main shaft 12. A tubular central portion 40 of the chuck sliding in the chuck cylinder 37 has three wedges 41 attached to its outer end through the links 42. The wedges work on a conical surface 43 in the outer end of the chuck cylinder 37 and are normally drawn inwardly by the action of the spring 44 which rests upon the stop 45 fastened to the inside of the chuck cylinder 37 and presses against the collar 46 attached to the outside of the inner end of the central portion 40. The stop 45 by striking the shoulder on the outer end of the central portion limits its inward movement. The chuck is operated by the following described means.

The standard 47 (Figs. 1 and 3) has two similar arms 48 and through each arm slides a rod 49 which is prevented from rotation by an arm 50 fastened to the lower end of the rod 49 and having a pin 51 slidably fitted in a hole 52 in the arm 48. To the upper end of the rod 49 is fastened an arm 53 whose end is aligned over the chuck in position A and whose end has a tubular ball thrust bearing 54 centered with the central portion 40 on the chuck and of sufficient length that when the rod 49 is depressed by means described later, the bearing 54 bears against the central portion 40 and compresses the spring 44 thus causing the chuck to release. The arm 53 has an opening 55 (Fig. 3) aligned with and of the same size as the tubular portion of the bearing 54 which in turn aligns with and is of the same size as the tubular portion of the central portion 40 of the chuck. Both arms 53 are similar, the left arm 53 (Fig. 1) being used to open the chuck, as later described for feeding the glass tube in position A and the right arm 53 being used to release the flared glass tube in position F. Glass tubing of the desired length is fed from the tubular funnel 56 attached to the left arm (Fig. 1) over the opening 55 through the arm 53 and into the central portion 40 at the time the arm 53 is depressed. The length of tube extending from the end of the chuck is fixed or gauged by the position of the bolt 57 (Fig. 1) against which the end of the tube rests. The bolt 57 is carried in the standard 58 attached to the bed 10 and is adjusted by screwing into or out of the standard 58. The nut 59 on the bolt 57 serves to hold the bolt in position when adjusted.

Slidably held in the center of the standard 47 is the rod 60 (Fig. 1) to whose upper end is attached a T-shaped arm 61 which rotatably carries a roller 62 (Figs. 1, 2 and 3) at each end of the short arms of the T. Each roller rests upon one of the two arms 53 and eliminates friction between the arms 53 and the arm 61 when the rod 60 is drawn downward by the action of the cam 63 (Fig. 3) on the roller 64 attached to the arm 65 on the shaft 66 (Fig. 1) having an arm 67 fastened thereto which is connected to the rod 60 through the link 68. The downward movement of the rod 60 depresses the arms 53 which releases the chuck as previously described. The arms 53 are held normally in an elevated position by the action of the springs 69 one end of which is fastened to an arm 48 by the screw 70 and the other end of the rod 49 by a pin 71. This causes the arm 65 to be held against the cam 63. The cam 63 is fastened to the shaft 23 previously mentioned.

The face plate 27 (Fig. 5) is normally locked against rotation by the insertion in the notches 72 (of which there are six around the periphery of the face plate 27) of a block 73 fastened to one arm of a crank 74 pivoted at 75 to the standard 11. A spring 76 held in a support 77 attached to the bed 10 bears against the head of the block 73 and tends to seat it firmly in the notch 72. The block 73 is withdrawn from the notch 72 by the action of a cam 78 (Figs. 4 and 5) fastened on the front end of the shaft 23 on the block 79 attached to the second arm of the crank 74.

The gear 24 (Figs. 2 and 4), driven as previously described is fastened to one end of the tubular shaft 25 carried by an arm on the standard 11. On the other end of the shaft 25 is fastened a collar 80 to which is attached a disc 81. Through the tubular shaft 25 and a second arm of the standard 11 passes the shaft 82 (Fig. 4) to which is fastened the cylinder 83 having a square groove 84 intermediate of its faces in a portion of which normally rests the tapered curved finger 85 of the crank 86 (Fig. 5) which is pivoted at 87 on an arm of the standard 11. A key 88 (Fig. 4) having a shoulder 89 fits into a recess 90 of the cylinder 83. The disc 81 has a recess 91 in its face into which the end of the key 88 is forced during the operation of indexing by the spring 92 carried in a hole 93 of the key and one end of which bears against the key and the other against a plate 94 fastened to the cylinder 83. As the cylinder is rotated in the direction indicated by the arrows the shoulder 89 of the key slides up on the tapered curved finger 85 and the end is withdrawn from the recess 91 in the disc 81 of the rotation of the cylinder and shaft 82 is stopped. At the appropriate time a cam 95 (Figs. 4 and 5) fastened to the shaft 23 strikes the arm 96 of the crank 86 causing the finger 85 to be withdrawn from the groove 84 of the cylinder 83, thus permitting the key 88 to be forced into engagement with the recess 91 of the rotating disc 81 to cause rotation of the shaft 82. A spring 97 having one end fastened to the bed 10 and the other to the arm 96 causes the finger 85 of the crank to be returned to the groove 84 as soon as the cam 95 has passed. On the inner end of the shaft 82 is fastened an arm 98 (Figs. 4 and 5) which engages by means of a roller 99 attached thereto by the pin 100 a slot 101 of the indexing plate 30 (previously mentioned). As the shaft 82 is rotated, as just described, the indexing plate 30 and attached parts are turned through an angle equal to the angle between two adjacent slots 101 of which there are six shown on the present machine. This gives the face plate 27 and attached holders a step by step movement to present the glass tube to various positions as more fully described hereinafter.

At position B (Fig. 1), the end of the glass tube 102 is heated by the flame from the gas jet 103; at position C, it is further heated by the gas jet 104; at position D, intensive heating is effected by the gas jets 105 (shown in Fig. 2); and at position E, the tube is flared while heated by the gas jet 106 (Fig. 1) by a flaring tool 107 which is shaped similar to a pointed blade so that it turns outwardly the heated end of the glass tube to form a flare. The flaring tool 107 is (Figs. 1 and 2) fastened to an upright arm 108 pivoted at 109 to the standard 110 attached to the bed 10. A spring 111 (Fig. 1) contained in a recess 112 of the standard 110 and having one end centered around a' pin 113 fastened in the arm 108 tends to force the arm 108 away from the standard 110 and toward the glass tube 102. This outward movement if comparatively small is adjusted by the position of the nut 114, locked by the nut 115, on the rod 116 passing through the upper end of the standard 110 and pinned at 117 to the arm 108 so that the nut 114 rests against the shoulder 118 of the standard 110. The cam 119 (Fig. 4) fastened to the shaft 23 through the roller 120 (Figs. 1 and 2) pinned at 121 to an arm of the crank 122, which is pivoted at 123 to the bearing standard 124 on the base 10 and the end whose other arm presses at 125 (Fig. 1) against the upright arm 108, holds the pointed tool 107 back against the pressure of spring 111. The face of the cam 119 is such that at the appropriate time the tool 107 is gradually permitted to move or advance toward the revolving heated glass tube 102 to flare it and after the tube is flared to quickly force backward or withdraw the tool 107. The tube 102 is here shown as having been flared (position E, Fig. 1). The limit of the outward movement of the tool 107 is determined by the maximum difference in the levels of the cam contour.

In position F, (Fig. 1), the flared tube 102 is permitted to cool slightly and is then dropped, by being released from the holder 34, on a chute 126 which conducts it to a suitable container.

In operation, glass tubes are placed in the tube holders 34 at position A, at positions B, C and D the tube is locally heated at the end while being revolved in the tube holders; at position E while still being heated and revolved, the tube is flared by the tool 107; at position F, the tube is permitted to cool while still revolving and is then released from the holder to drop on the chute 126 which places it in a suitable container.

I have described a specific machine embodying my invention but it is to be understood that various modifications thereof will readily suggest themselves to those skilled in the art.

What I claim as new and desire to secure by Letters Patent of the United States, is:

1. In a machine for shaping glass tubes, the combination of a carrier rotatable in a substantially vertical plane, a holder mounted thereon having a passage therethrough disposed so as to allow a glass tube to feed therethrough by gravity, and means for gripping said tube, means disposed in the path of travel of said holder whereby tubes may be fed to said holder, tube heating and shaping means disposed in the path of travel of said holder, and means automatically brought into operation for periodically opening said gripping means to discharge a tube and for subsequently causing said gripping means to close upon a fresh tube.

2. In a machine for shaping glass tubes, the combination of a carrier rotatable in a substantially vertical plane, a rotatable holder mounted thereon having a passage therethrough disposed so as to allow a glass tube to feed therethrough by gravity, and means for gripping said tube, means disposed in the path of travel of said holder whereby tubes may be fed to said holder, tube heating and shaping means disposed in the path of travel of said holder, and means automatically brought into operation for periodically opening said gripping means to discharge a tube and for subsequently causing said gripping means to close upon a fresh tube.

3. In a machine for shaping glass tubes, the combination of a carrier rotatable in a substantially vertical plane, a plurality of holders mounted thereon, each having a passage therethrough disposed so as to allow a glass tube to feed therethrough by gravity, and means for gripping said tube, means disposed in the path of travel of said holders whereby tubes may be fed to said holders, tube heating and shaping means disposed in the path of travel of said holders, and means automatically brought into operation for periodically opening said gripping means to discharge a tube and for subsequently causing said gripping means to close upon a fresh tube.

4. In a machine for shaping glass tubes, a rotatable carrier disposed in a substantially vertical plane and having thereon a series of holders each comprising a passage through which a glass tube may feed by gravity and means for gripping said tube, automatic means for opening said gripping means to receive said tube, automatic means for determining the length of tube projecting from each of said holders, a shaping tool mounted adjacent to the path of travel of said tube ends and means whereby said tube is automatically and periodically reciprocated to enter each of said tube ends in succession to give it a desired form.

5. In a machine for shaping glass tubes, a rotatable carrier disposed in a substantially vertical plane and having thereon a series of holders each comprising a passage through which a glass tube may feed by gravity and means for gripping said tube, automatic means for opening said gripping means to receive said tube, automatic means for determining the length of tube projecting from each of said holders, a flare tool for shaping said tubes mounted adjacent to the path of travel of said tube ends and means whereby said tube is automatically and periodically reciprocated to enter each of said tube ends in succession to give it a desired form.

6. In a machine for shaping glass tubes, a rotatable carrier disposed in a substantially vertical plane and having thereon a series of holders each comprising a passage through which a glass tube may feed by gravity and means for gripping said tube, automatic means for opening said gripping means to receive said tube, automatic means for determining the length of tube projecting from each of said holders, a shaping tool mounted adjacent to the path of travel of said tube ends, means whereby said tube is automatically and periodically reciprocated to enter each of said tube ends in succession to give it a desired form, and means for subsequently discharging the shaped tube.

7. In a machine for shaping glass tubes, a rotatable carrier disposed in a substantially vertical plane and having thereon a series of holders each comprising a passage through which a glass tube may feed by gravity and means for gripping said tube, automatic means for opening said gripping means to receive said tube, automatic means for determining the length of tube projecting from each of said holders, a horizontally disposed shaping tool mounted adjacent to the path of travel of said tube ends and means whereby said tube is automatically and periodically reciprocated to enter each of said tube ends in succession to give it a desired form.

8. In a machine for flaring tubes, the combination with a spinning tool and a blow pipe for directing a flame toward the operative position of said tool, of a turret rotatable about a horizontal axis and having a plurality of rotatable work holding chucks and adapted to present a plurality of work pieces successively to the flame and to the tool.

9. In a machine for flaring tubes, the combination with a spinning tool and a blow pipe for directing the flame toward the operative position of said tool, of a turret having a plurality of work holders rotatably mounted thereon and adapted to present a plurality of work pieces successively to the flame and to the tool, and a single shaft for simultaneously rotating said work holders.

10. In a machine for flaring tubes, a carrier, a plurality of rotatable tube holders, means for simultaneously rotating said tube holders, means for heating the tubes and means for flaring said tubes while heated.

11. In a machine for flaring tubes, a carrier, means for advancing said carrier step-by-step, a plurality of tube holders, means for rotating said tube holders, means for heating said tubes, means for flaring said tubes while heated, said means comprising a flaring tool, means for advancing said tool toward said heated glass tube and means for withdrawing said tool from said heated glass tube.

12. In a machine for flaring tubes, a shaft, a carrier, a plurality of work holders rotatably mounted on said carrier, said work holders being simultaneously rotated by said shaft, and a spinning tool for flaring tubes carried by said work holders.

13. In a machine for flaring tubes, a shaft, a carrier, a plurality of work holders rotatably mounted on said carrier, said work holders being simultaneously rotated by said shaft, means for heating tubes carried by said holders, and means for flaring said tubes while heated.

In witness whereof, I have hereunto set my hand this sixteenth day of October, 1919.

FRANCIS J. RIPPL.